June 25, 1968 J. S. ALSOBROOK, JR Re. 26,411

TILTING ACCESSORY FOR STANDARD BED AND TILTING HOLLYWOOD BED FRAME

Original Filed Jan. 27, 1965 3 Sheets-Sheet 1

INVENTOR
JAMES SAMUEL ALSOBROOK, JR.
BY Lamont Johnston
ATTORNEY

INVENTOR
JAMES SAMUEL ALSOBROOK, JR.
BY Lamont Johnston
ATTORNEY

June 25, 1968 J. S. ALSOBROOK, JR Re. 26,411

TILTING ACCESSORY FOR STANDARD BED AND TILTING HOLLYWOOD BED FRAME

Original Filed Jan. 27, 1965 3 Sheets-Sheet 3

INVENTOR
JAMES SAMUEL ALSOBROOK, JR.
BY Lamont Johnston
ATTORNEY

United States Patent Office

Re. 26,411
Reissued June 25, 1968

26,411

TILTING ACCESSORY FOR STANDARD BED AND TILTING HOLLYWOOD BED FRAME

James Samuel Alsobrook, Jr., Fairyland, Ga., assignor to ADX Corporation, Chattanooga, Tenn., a corporation of Tennessee Original No. 3,259,921, dated July 12, 1966, Ser. No. 428,338, Jan. 27, 1965. Application for reissue Aug. 22, 1967, Ser. No. 663,457
11 Claims. (Cl. 5—62)

Matter enclosed in heavy brackets [ ] appears in the original patent but forms no part of this reissue specification; matter printed in italics indicates the additions made by reissue.

*ABSTRACT OF THE DISCLOSURE*

*A tilting accessory for a standard bed and a tilting Hollywood type bed frame formed with a pair of rails which are raised and lowered at one end by a lever mechanism in order to elevate one end of the bedding supported thereon with respect to the other end.*

This invention relates to an accessory for a standard bed *and to a Hollywood type bed frame* by which the springs and mattress can be tilted to an inclination in a flat plane.

In the cases of many people having different physical ailments, it is either necessary or very desirable for them to be able to rest and sleep in inclined positions. One of such conditions is that of hiatus hernia, in which it is necessary to rest with the head elevated; another such condition is that of cardiac failure, in which sleeping in a head high position alleviates discomfort. Other conditions require that rest and sleep be in a foot high position, some of these being gross varicosities and phlebitis resulting from diabetes.

Many devices have been proposed in the past for providing a resting or sleeping surface which is inclined. These are impractical for several reasons. Most of them require that the entire bed be specially constructed, making it very costly and not blending with other furniture in a harmonious decorative plan. Many of such special beds are also complicated in construction, adding considerably to their cost.

Accordingly, one object of this invention is to provide for use with a standard bed an accessory to be placed between the springs and the slat barriers by which the springs and mattress can be raised from a horizontal to an inclined position for use and can be lowered again, when not in use.

Another object is to provide such an accessory having transverse frame members which are adjustable in length to fit the width of any standard bedstead.

A further object is to provide such an accessory which is readily adaptable for shipment in knocked-down condition and which can easily and quickly be set up in place on a bedstead, with the longitudinal and transverse frame members arranged accurately in positions normal to each other and without requiring accurate measuring to be placed in such positions.

Still another object of the invention is to provide such an accessory having means for locking it in elevated position which is simple and inexpensive and also positive and unfailing.

A still further object is to provide such an accessory including an elevated lever having an absolutely steady but freely pivoting bearing.

Another object is to provide such an accessory which is simple and inexpensive in construction, as well as simple and reliable in operation.

Other objects and advantages of the invention will be apparent from the following description, taken in conjunction with the accompanying drawings, in which.

Figure 10:
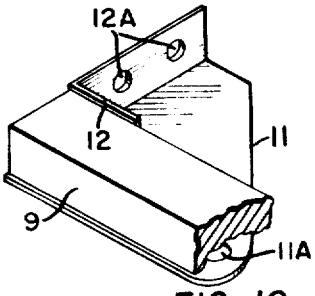
Figure 11:
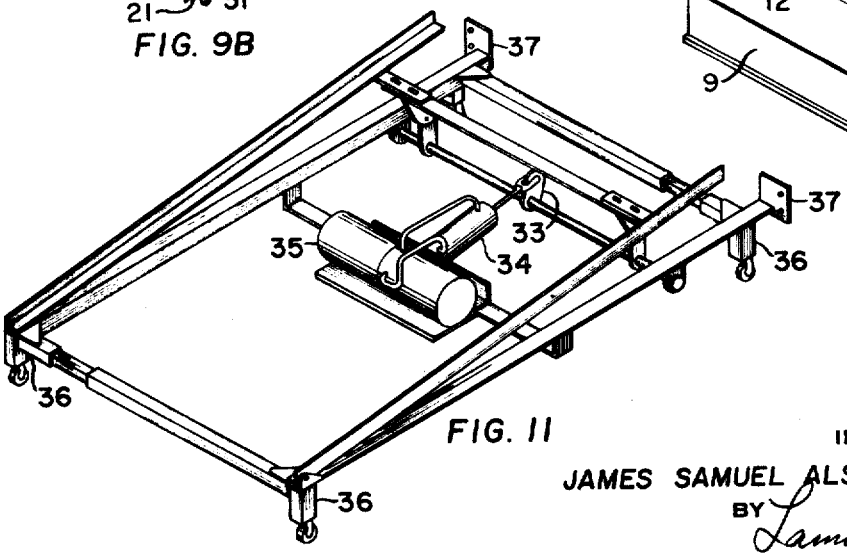

FIG. 10 is an enlarged perspective view of one of the horizontal corner plates by which the longitudinal rails of the accessory are pivotally connected to the transverse stretches, showing the end of a stretcher and a stop member for limiting the pivotal movement of the stretcher; and FIG. 11 is a perspective view of a modified form of the accessory *showing it as a Hollywood type bed frame and* in which is illustrated a possible application of a power drive replacing manual operation.

Figure 1:
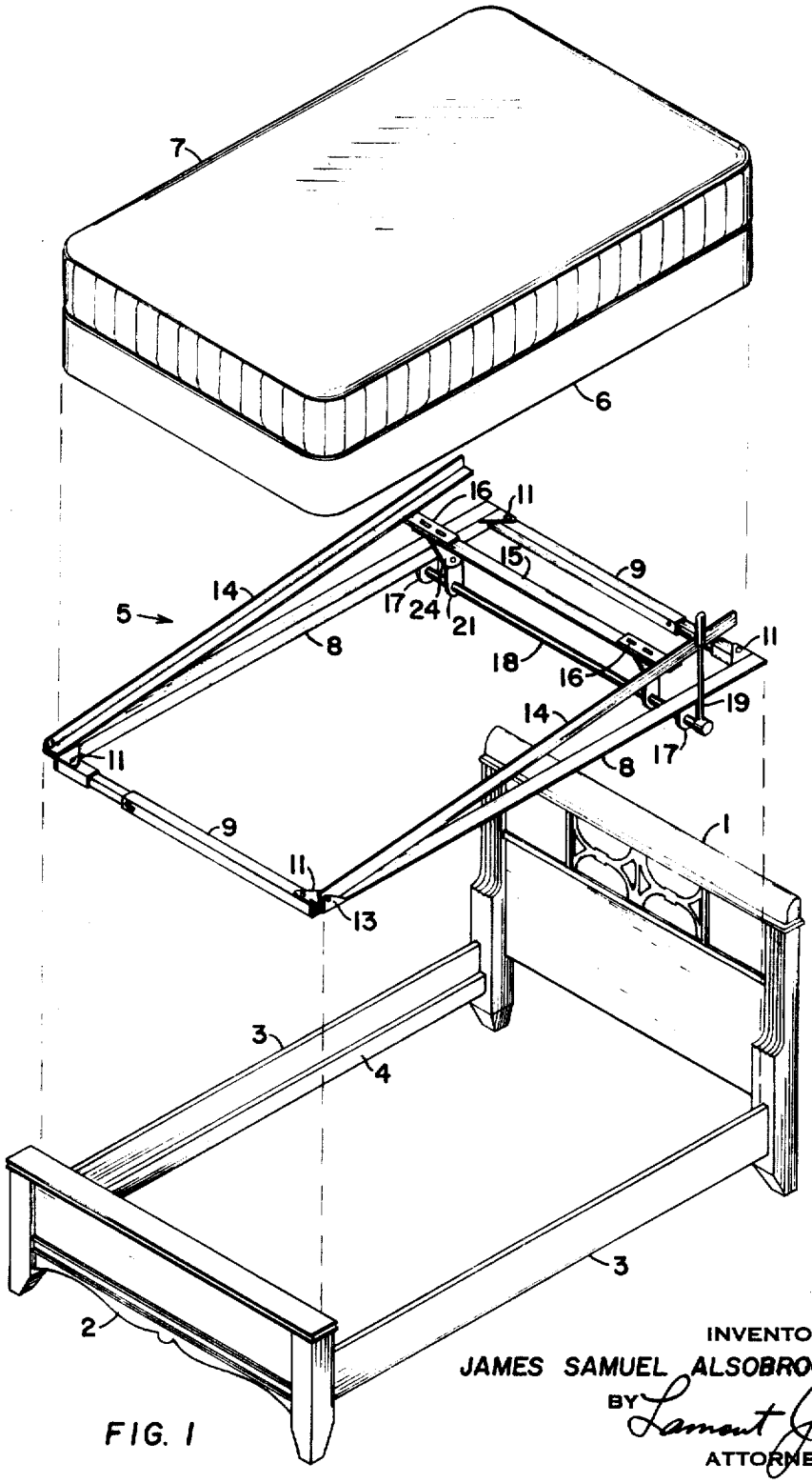
FIG. 1 is an exploded perspective view of a bed incorporating an accessory made in accordance with this invention.
Figure 2:
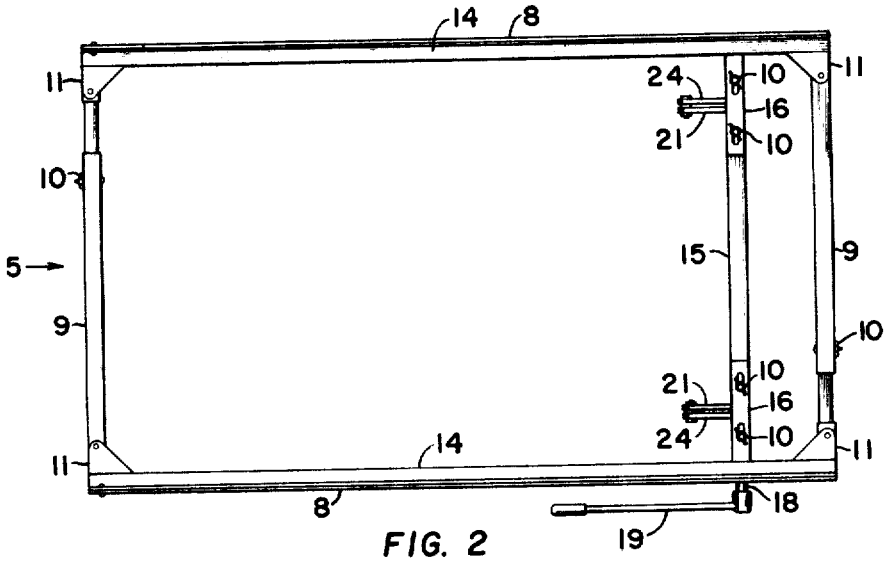
FIG. 2 is a plan view of the accessory illustrated in FIG. 1.
Figure 3:
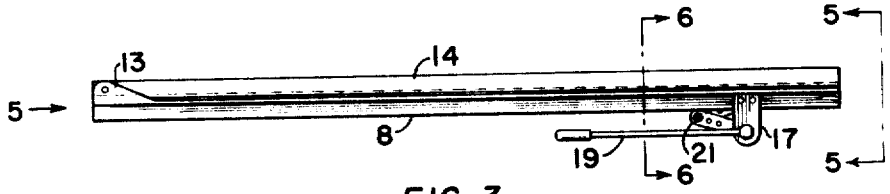
FIG. 3 is a side view of the accessory in lowered position.
Figure 4:
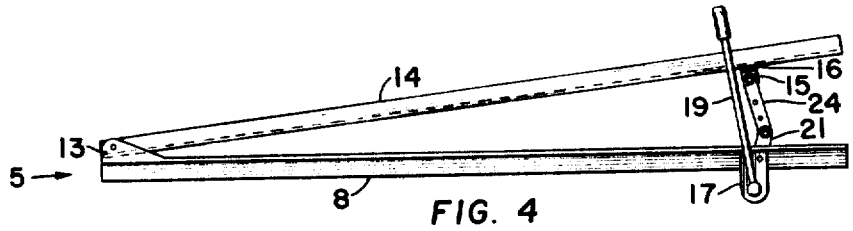
FIG. 4 is a side view of the accessory in raised position.
Figure 5:
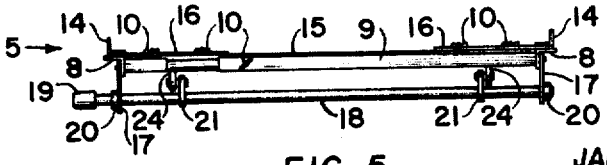
FIG. 5 is an end view of the accessory, as seen from the right on the line 5—5 of FIG. 3.

Referring now to the drawings, there is shown in FIG. 1 a standard bed including a bedstead having a head 1 with legs, a foot 2 with legs, connecting side members 3 and, attached to or formed integrally with the side members, inwardly projecting *spring support means such as* slat barriers 4 adapted to support transverse slats which hold up the springs in ordinary use of the bed. Adapted to rest upon the slat barriers 4, within the side members 3 and within the head 1 and foot 2, is an accessory made in accordance with this invention, generally indicated at 5. Standard springs 6 are adapted to rest upon the accessory 5 and to support a standard mattress 7.

As shown in FIGS. 2 through 6, the accessory 5 includes a pair of spaced parallel longitudinal lower rails 8 adapted to rest upon and be supported by the slat barriers 4. The rails 8 constitute, with other parts to be described, a primary supporting frame; they are connected together by a pair of spaced transverse stretchers 9. The stretchers are adjustable in length and may, for example, consist of telescoping angle iron or channel members which are secured in their adjusted positions by means of bolts and wing nuts 10 engaging in suitable elongated slots in the members. At each end of each longitudinal lower rail 8 is fixed at least one horizontal plate 11 forming a lower corner plate to which the stretchers 9 are pivotally attached near their ends, through holes 11A. The plate in each corner has a stop member thereon against which the end of the stretcher 9 abuts when the accessory is assembled from a knock-down position, in which it is shipped and stored. The stop member may be an upstanding flange 12, as illustrated in FIG. 10 connected to the lower rail 8 through holes 12A, or it may be any other suitable form of abutment, such as a pin, bolt, or the like. As can be readily seen, the stop member limits the pivotal movement of the stretcher and instantly positions the stretcher at a right angle or normal to the longitudinal rail 8 to which it is pivotally attached by the intermediate means of corner plate 11. If desired, a corresponding and parallel upper plate may also be provided, enclosing between the two plates the end of the stretcher.

A secondary supporting frame is pivoted to the primary supporting frame on a transverse axis at one end of the primary frame as, for example, to an upper corner plate 13 having an upstanding flange serving as a hinge plate. The secondary supporting frame includes a pair of parallel longitudinal rails 14, each pivoted to the primary supporting frame and connected near their opposite ends by an adjustable stretcher comprising an elevating bar 15 and elevating slides 16, FIG. 6, fastened to the extremities of the bar. Like the stretcher 9, the stretchers comprising the bar 15 and slides 16 is adjustable in length by engagement in suitable elongated slots therein of bolts and wing nuts 10.

Projecting downwardly from each of the longitudinal rails 8 is a shaft bearing plate 17, FIGS. 3–8, located adjacent to the ends of the rails opposite the pivotal axis of the secondary supporting frame. A rotatable torque shaft 18 is mounted transversely for rotation in the shaft bearing plates 17. A manual operating lever 19 is fixed or keyed onto one end of the shaft 18 so as to rotate the shaft when the lever is moved. The length of the operating lever 19 is no greater than the distance from the center of the torque shaft 18 to the top of the mattress 7, in the raised position, so that, in its upper position, it cannot be accidentally lowered, e.g. while the occupant of the bed is asleep. Adjusting collars 20 are provided adjacent to the ends of the shaft 18, abutting against the bearings plates 17, to adjust the length of the shaft to correspond to the width of the primary supporting frame and the bed and to hold the shaft in the proper transverse position.

Figure 8:
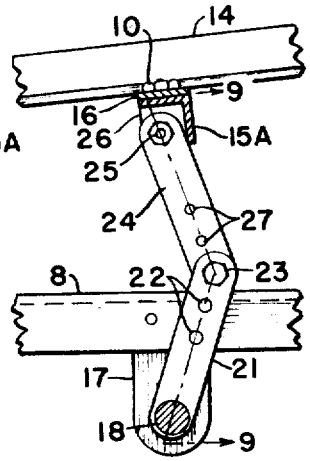
FIG. 8 is a sectional view similar to FIG. 7, but showing the elevating lever in raised position, with the gravity lock in use.

To the shaft 18 is fixed, as by welding or the like, at least one torque lever or crank 21 in a vertical plane. Near its opposite end, the crank has a series of spaced adjusting holes 22 and it is connected by means of a bearing, generally indicated at 23, to a drag link or connecting rod 24. The other end of the connecting rod is pivotally attached at 25 to a drag link bearing clip 26 which, in turn, is fixed to the lower surface of the elevating bar 15. The transverse elevating bar 15 may be an angle iron with a side 15A extending vertically downwardly in such a way that when the elevating lever comprising the crank 21 and the connecting rod 24 is moved past a straight line position in elevating the secondary supporting frame, the side of the connecting rod 24 abuts against the depending flange 15A of the elevating bar 15 and becomes locked in elevated position by the weight resting upon the secondary supporting frame, as shown in FIG. 8.

Figure 9A:
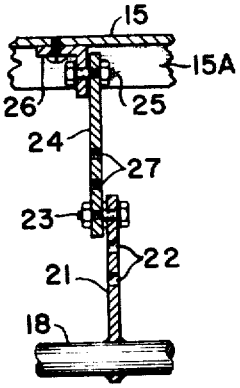
FIG. 9A is a sectional view on the line 9—9 of FIG. 8, showing the bearing by which the members of the elevating lever are connected.
Figure 9B:
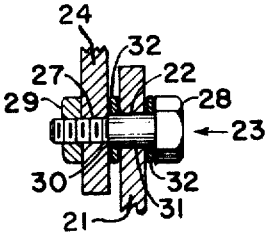
FIG. 9B is a partial enlarged sectional view of the bearing shown in FIG. 9A.

As in the case of the crank 21, the connecting rod 24 has formed in it a plurality of adjusting holes 27, which are preferably tapped to receive the threads of a scissor type bearing bolt 28 having a nut 29 thereon, shown in FIG. 9B. The bolt 28 has, at the inner end of its threads, an abutment surface 30, so that the connecting rod 24 can be fastened securely against the abutment 30 by the nut 29. The crank 21 is pivotally mounted upon the bearing portion 31 of the bolt and is positioned firmly but so as to be freely rotatable between the head of the bolt and the adjacent portion of the connecting rod 24 by flat spacer washers 32. In this way, a bearing is provided which is locked firmly in place on one of the elevating lever members, e.g. the connecting rod 24, at the same time providing free pivoting on the bolt of the other lever member, e.g. the crank 21, without any sidewise motion or wobbling.

In operation of the manual model, the operating lever 19 is moved through an arc of about 90°, causing the torque shaft 18 to rotate and actuating the cranks 21 which, through the scissor bearings 23, apply force to the connecting rods 24. The connecting rods, in turn, transmit the lifting force to the bearing clips 26 and to the elevating bar 15 and elevating slides 16 forming part of the secondary frame. This causes the secondary frame to rise above the primary frame, pivoting around the transverse axis in the corner plates 13, thus raising the springs 6 and mattress 7 to an inclined flat plane. By adjustment of the bearing bolts 23 to appropriate adjusting holes 22 and 27, the amount of inclination of the plane can be varied. The operation of the power model illustrated in FIG. 11 is similar to that of the manual model, with the exception of the adjustment of elevation, which is determined by the distance of thrust of the piston rod extending from the cylinder 34 exerted on the crank 33.

Figure 6:
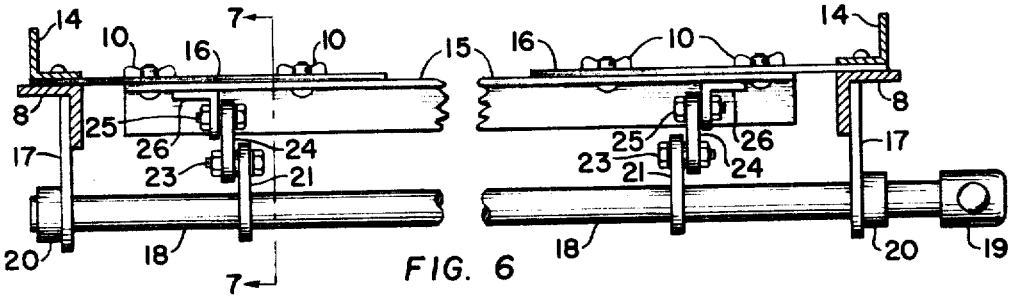
FIG. 6 is an enlarged sectional view, partly broken away, on the line 6—6 of FIG. 3, showing the elevation mechanism.
Figure 7:
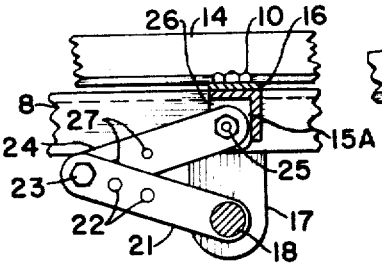
FIG. 7 is a sectional view on line 7—7 of FIG. 6, showing the lever for elevating the accessory in lowered position.

When it is desired to change the manual operating lever from one side of the bed to the other, the attaching bolts for the torque shaft bearing plates 17, shown best in FIG. 6, are removed from the primary supporting frame. The cranks 21 are disconnected from the connecting rods 24 by removing the bearing bolts 23. The ends of the torque shaft 18 are reversed and the parts just described are reassembled in the reverse of their original order.

If desired, the adjustable elevating bar 15 can be disconnected and reversed, at the same time reversing the mechanical action of the manual model. The position of the operating lever 19 can be made vertical when the secondary supporting frame is lowered, thereby enabling the user to apply his weight to push down on the operating lever, instead of pulling up, to accomplish elevation. The lock provided by the vertical web 15A of the elevating bar 15, against which the connecting rod 24 abuts, will still be effective to lock the secondary supporting frame in a raised position.

In the power-operated modification of FIG. 11, the manual operating lever is replaced by a suitable source of power, such as an electric motor, a hydraulic pump, a compressed air cylinder, or the like. In this case, the elevation safety lock comprising the abutment of the connecting rod 24 against the depending flange 15A of the elevating bar 15 is not necessary. In place of the crank 19 on the manual model, the power model has a torque lever or crank 33 fixed or keyed to the rotatable torque shaft 18. A suitable means of power, such as a double acting hydraulic cylinder 34, is pivotally connected to the crank 33, the cylinder being actuated by a hydraulic power pack, i.e., an electric motor and pump 35. Suitable controls, not shown, are provided for actuating the power model.

Although the accessory of this invention is especially useful as an attachment to a standard bed, it can be converted to a bed frame, itself. Either the manual or the power-operated model may have castered legs 36 and suitable mounting plates 37 for attachment of a headboard, converting it to a Hollywood bed.

By this invention, there is provided an accessory for tilting springs and a mattress which can be easily installed on any conventional bed without requiring the use of screws, nails, or the like on the bed to hold the accessory in position. One bed so equipped can be a Hollywood bed and an identical Hollywood bed can be furnished, without the mechanism, at a very reasonable cost. The accessory is readily adjustable for use with any conventional bed having standard beds, springs and mattresses of different widths.

The stop members provided for the transverse stretchers enable quick setting up, from a knocked-down condition of shipment, of the accessory with the transverse stretcher members virtually perpendicular to the longitudinal members.

The sleeping surface is safely locked in the inclined position and cannot be accidentally closed.

A sleeping surface is provided which is in a flat plane. The sleepng surface may be raised either at the head or the foot to the desired angle. The device may be easily raised or lowered by one person. It can be readily adapted to motorized or power operation, as well as to manual operation.

The mechanism is engineered with materials to provide a maximum of strength and a minimum of weight. The entire manual mechanism can be installed by the average man. The mechanical characteristics of the device are stable, with no unwanted motion or noise. The device can be easily produced at a very reasonable cost for purchase by people of moderate means.

The mechanism of the accessory does not interfere with dusting or cleaning under the bed and it does not interfere with bed decorations, such as bedspreads, dust ruffles, etc. The device is not easily noticeable when it is in a closed position.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. In combination with a standard bedstead having side members including slat barriers, an accessory for tilting springs and a mattress to an inclination comprising a primary supporting frame, including a pair of spaced parallel longitudinal rails supported on the slat barriers, a horizontal plate fixed to each end of each rail, and a pair of spaced transverse stretchers pivotally connected at each end to one of the plates, each plate having fixed thereon a stop member arresting the pivotal movement of the stretcher when it is normal to the adjacent rail.

2. In combination with a standard bedstead having side members including slat barriers, an accessory for tilting springs and a mattress to an inclination comprising: a primary supporting frame, including a pair of spaced parallel longitudinal rails and a pair of spaced transverse stretchers pivotally connected to the rails by horizontal plates fixed to the rails, the plates having fixed thereon stop members limiting the pivotal movement of the stretchers to positions normal to the rails, each of said stretchers being adjustable in length to cause the rails to rest on the slat barriers; a secondary supporting frame pivoted to the primary supporting frame on a transverse axis at one end of the primary frame, a rotatable shaft pivotally supported by the primary frame adjacent to its opposite end, means for rotating the shaft, at least one crank and connecting rod elevating lever connected between the primary frame and the secondary frame, the end of the crank being fixed to the shaft, the end of the connecting rod being pivotally connected to the secondary frame and the secondary frame including a stop member engageable by the connecting rod when the lever is moved past a straight line position.

*3. A bedding support and tilting device for moving bedding supported thereon between a normal level position and an inclined position, comprising: a primary supporting frame, including a pair of spaced parallel longitudinal rails and a pair of spaced transverse stretchers pivotally connected to the rails, stop means limiting the pivotal movement of the stretchers to positions normal to the rails, each of said stretchers being adjustable in length, a secondary supporting frame pivoted to the primary supporting frame on a transverse axis at one end of the primary frame, a rotatable shaft pivotally supported by the primary frame adjacent to its opposite ends, means for rotating the shaft, at least one crank and connecting rod elevating lever connected between the primary frame and the secondary frame, the end of the crank being fixed to the shaft, the end of the connecting rod being pivotally connected to the secondary frame, and the secondary frame including a stop member engageable by the connecting rod when the lever is moved past a straight line position.*

*4. The device of claim 3 further comprising legs on said primary frame adjacent the pivotal connections of said stretchers with said rails, and mounting plates on said rails for the attachment of a headboard thereto forming a Hollywood type bed.*

*5. The device of claim 3 in which said means for rotating said shaft comprises an operating lever attached to said shaft transversely outwardly of one of said rails and having a length no greater than the distance from the center of said shaft, when the tilting device is in the inclined position, to the top of said bedding supported thereon.*

*6. The device of claim 5 in which said shaft is reversibly supported on said primary frame to provide for the changing of the position of said operating lever to the other side of said primary frame.*

*7. The device as defined in claim 3 further comprising means adjustably connecting said crank and said connecting rod for varying the degree of inclination of said inclined position of said secondary supporting frame with respect to said primary frame.*

*8. The device as defined in claim 3 wherein said secondary frame further comprises a further pair of longitudinally extending rails each pivoted at one end to said primary support frame rails, a transverse adjustable elevating bar extending between said second pair of rails joining said second pair of rails adjacent the opposite ends thereof, and said connecting rod being pivotally connected to said bar.*

*9. The device of claim 8 in which said bar is formed with a downwardly depending web defining said stop member.*

*10. In combination with a standard bedstead having side members including spring support means, an accessory for tilting springs and a mattress to an inclination comprising a primary supporting frame, including a pair of spaced parallel longitudinal rails supported on the spring support means, a horizontal plate fixed to each end of each rail, and a pair of spaced transverse stretchers pivotally connected at each end to one of the plates, each plate having fixed thereon a stop member arresting the pivotal movement of the stretcher when it is normal to the adjacent rail.*

*11. In combination with a standard bedstead having side members including spring support means, an accessory for tilting springs and a mattress to an inclination comprising: a primary supporting frame, including a pair of spaced parallel longitiudinal rails and a pair of spaced transverse stretchers pivotally connected to the rails by horizontal plates fixed to the rails, the plates having fixed thereon stop members limiting the pivotal movement of the stretchers to positions normal to the rails, each of said stretchers being adjustable in length to cause the rails to rest on the spring support means, a secondary supporting frame pivoted to the primary supporting frame on a transverse axis at one end of the primary frame, a rotatable shaft pivotally supported by the primary frame adjacent to its opposite end, means for rotating the shaft, at least one crank and connecting rod elevating lever connected between the primary frame and the secondary frame, the end of the crank being fixed to the shaft, the end of the connecting rod being pivotally connected to the secondary frame and the secondary frame including a stop member engageable by the connecting rod when the lever is moved past a straight line position.*

References Cited

The following references, cited by the Examiner, are of record in the patented file of this patent on the original patent.

UNITED STATES PATENTS

| | | | |
|---|---|---|---|
| 506,056 | 10/1893 | Millar | 5—62 |
| 984,879 | 2/1911 | Bartholome | 5—69 |
| 1,018,865 | 2/1912 | Benedetti | 5—62 |
| 1,967,771 | 7/1934 | Gardeski | 5—62 |
| 2,480,025 | 8/1949 | Hunter | 5—185 |

(Other references on following page)

UNITED STATES PATENTS

| | | | |
|---|---|---|---|
| 3,149,349 | 9/1964 | Nelson | 5—66 |
| 1,255,208 | 2/1918 | Muller | 5—73 X |
| 1,506,525 | 8/1924 | Hegedus | 5—62 |
| 1,899,762 | 2/1933 | Logan et al. | 5—66 |
| 2,939,157 | 6/1960 | Roche | 5—183 |
| 3,061,843 | 11/1962 | Singer et al. | 5—66 |

| | | | |
|---|---|---|---|
| 3,259,921 | 7/1966 | Alsobrook | 5—62 |
| 3,277,501 | 11/1966 | Frisz et al. | 5—62 X |

FOREIGN PATENTS

| | | |
|---|---|---|
| 530,861 | 7/1955 | Italy. |

CASMIR A. NUNBERG, *Primary Examiner.*